Mar. 13, 1923.

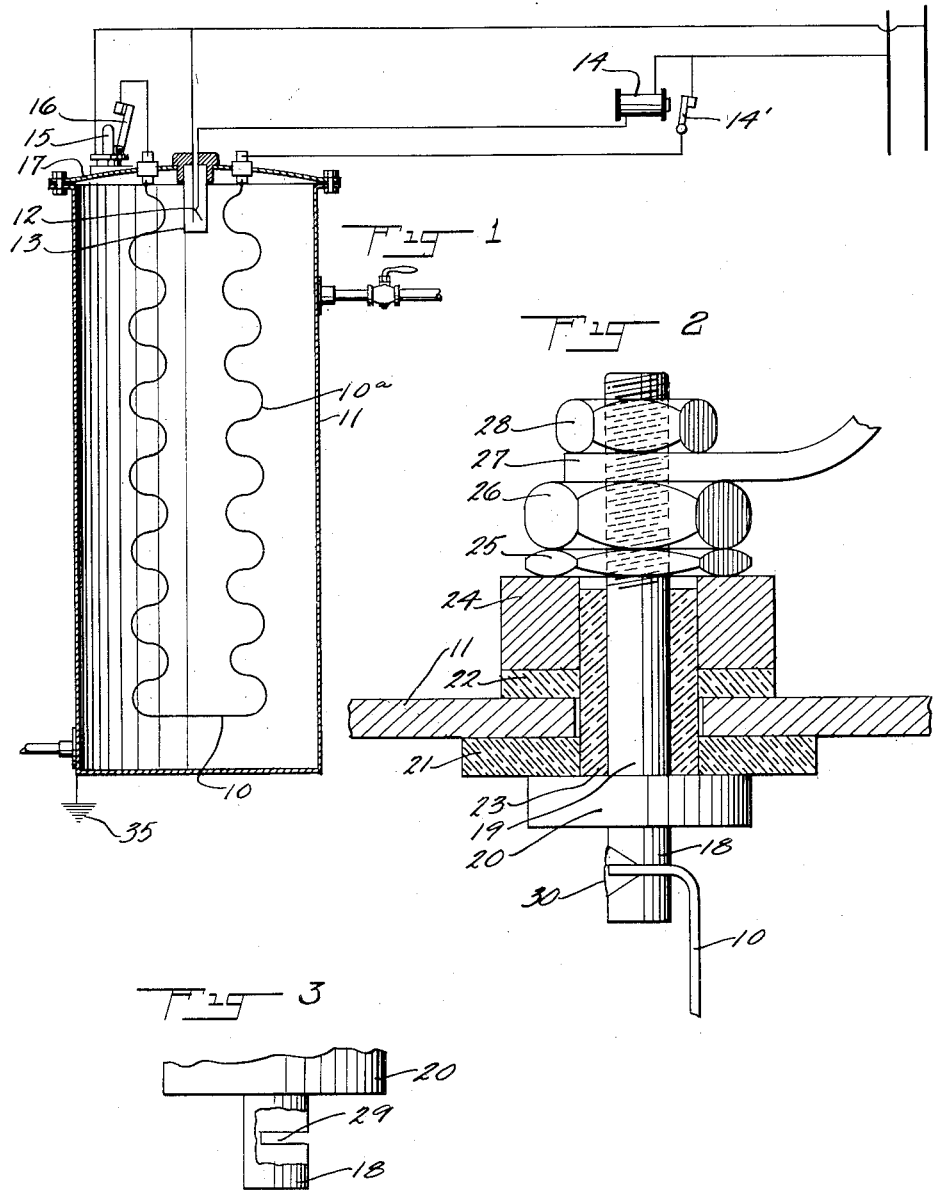

P. A. E. ARMSTRONG.
APPARATUS FOR ELECTRICAL HEATING OF FLUIDS.
FILED APR. 16, 1921.

1,448,510.

2 SHEETS—SHEET 2.

SINGLE PHASE

SINGLE PHASE

3 PHASE STAR

3 PHASE DELTA

3 PHASE STAR

3 PHASE DELTA

Inventor
P.A.E.Armstrong.
By His Attorney

Patented Mar. 13, 1923.

1,448,510

UNITED STATES PATENT OFFICE.

PERCY A. E. ARMSTRONG, OF LOUDONVILLE, NEW YORK.

APPARATUS FOR ELECTRICAL HEATING OF FLUIDS.

Application filed April 16, 1921. Serial No. 461,909.

*To all whom it may concern:*

Be it known that I, PERCY A. E. ARMSTRONG, a subject of the King of Great Britain, and a resident of Loudonville, county of Albany, and State of New York, have invented a new and useful Improvement in Apparatus for Electrical Heating of Fluids, of which the following is a specification.

My invention relates to an apparatus for and process of electrical heating of fluids, and particularly to the heating of water or other fluids in a tank or boiler by means of a non-rusting electrical heating element immersed partly or wholly in the fluid to be heated contained in the boiler or tank.

Heating elements of various alloys which are highly rust-resistant under the conditions of heating water may be used. I preferably make use of an iron-chromium alloy. The material I have found to be best adapted for this purpose is "sicro," which is an alloy of approximately the following combination: iron 75%, chromium 20%, silicon 2%, cobalt 2% and carbon .3%, with small percentages of manganese and sulfur and other impurities.

The heating elements may be arranged in various ways, as in series or in parallel, and the heating effect may be produced directly by the heating elements, which become heated by reason of their resistance to the passage of current, or to some extent by the passage of current through the water. The heated water may be utilized in various ways, as for a hot water supply in residences, for domestic heating, as by means of hot water or steam radiator systems, for producing steam in boilers, etc.

Figure 4:
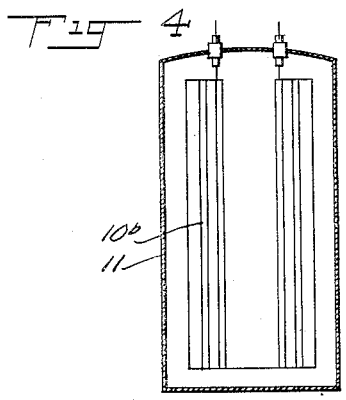
Figure 5:
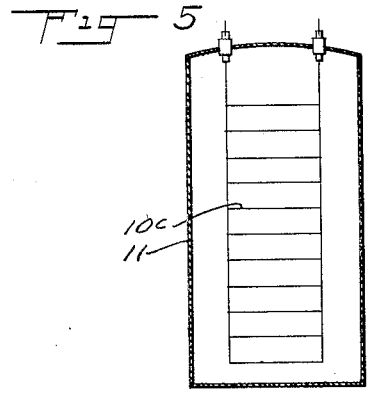
Figure 6:
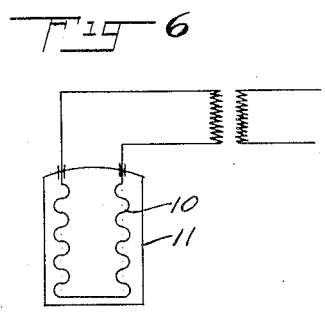
Figure 7:
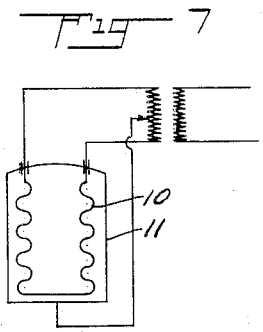
Figure 8:
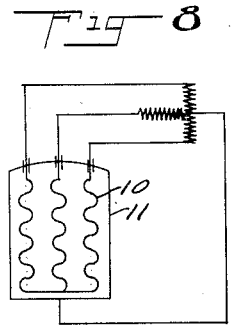
Figure 9:
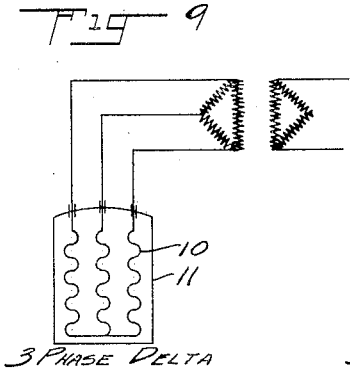
Figure 10:
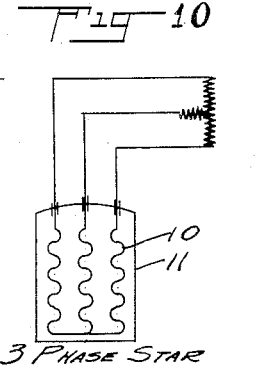
Figure 11:
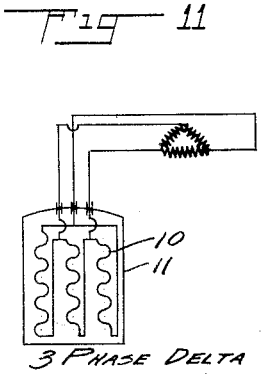
Figure 12:
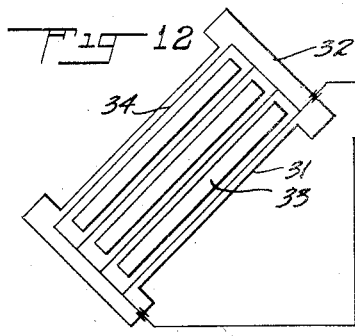

In the accompanying drawings, showing certain embodiments of my invention for the purpose of illustration and affording an understanding of the invention, but not for limitation thereof, Fig. 1 is a part vertical section, part diagrammatical view of a tank or boiler equipped with an electrical heating device with the heating element in series, Fig. 2 is a detail sectional view of an insulated tank connection, Fig. 3 is a detail view of means for securing a heating element in place, Fig. 4 is a diagrammatical view of one form of parallel arrangement of heating elements, Fig. 5 is a similar view of a second form of parallel arrangement, Figs. 6–11 are wiring diagrams for various alternating currents, and Fig. 12 is a diagrammatical view of a water tube boiler equipped with heating elements in accordance with one form of my invention.

Reference character 10 designates a heating element of non-rusting material such, for example, as "sicro," which retains a substantially metallic, non-rusty surface when exposed to water and heat. The elements may be straight or convoluted or coiled or of various other forms. In Fig. 1 the element 10ᵃ is convoluted and of series arrangement. In Fig. 4 the elements 10ᵇ are straight and arranged vertically and in parallel, and in Fig. 5 elements 10ᶜ are arranged in parallel and horizontal, and various other arrangements and forms may be provided. The elements as 10 are placed in a tank, boiler or the like 11, and are submerged in the water or other liquid to be heated and in direct contact therewith.

A variety of control means may be provided. Fig. 1 shows a thermostat 12 which may be exposed to the heat of the liquid in any suitable way, as by being contained in a holder 13 set into the tank 11. When the elements of thermostat 12 are in contact, a solenoid 14 is energized and the current is cut off by means of switch 14' being opened, and when they are out of contact, the switch 14' is closed, so that the current is again turned into the resistor elements and in this way automatic control is readily obtained. I may also use other means of control, as a safety valve 15 operating a switch 16 in any suitable manner. Switch 16 may be operated directly, for example, where the device is to be run at fairly high steam pressures, or it may be operated through means such as a relay, as where lower pressures such as used in ordinary house radiators are being utilized.

The part of the boiler or tank through which the current is led into the interior thereof is preferably made removable, so as to enable the parts to be readily assembled, cleaned and the like, and in Fig. 1, I have shown the tank 11 provided with a removable head 17 for this purpose.

A preferred form of insulating connection is shown in Fig. 2, in which the element 10 is secured to a stud 18 of a bolt member 19 having a head 20. The insulators are in the form of washers 21 and 22 and a sleeve 23. A metallic ring 24 is interposed between nuts 25, 26 and the washer 22, and terminal 27 is held in place by a binding nut 28.

When the element 10 is of ribbon form its end is received in the slot 29 of stem 18 and held in place by a welded or brazed joint, as shown at 30.

The current used may be direct or alternating. Various wiring connections for alternating currents are shown in Figs. 6 to 11 from which it clearly appears how the heating current may exert its effect through the resistance elements, or by current passing through the water, and as these figures of the drawings are made sufficiently plain by the legends accompanying same, no further explanation with respect thereto is necessary.

In Fig. 12 I have shown a water tube boiler 31, comprising headers 32 and water tubes 33, and electrical heating elements 34 running through the individual water tubes. With such arrangement the rapid and efficient production of steam is readily obtained and high steam pressure can be maintained even with rapid consumption of steam produced.

The tank or boiler is, of course, preferably covered with a suitable insulating covering or coating, which serves to prevent loss of heat and to protect against accidental short circuits and the like. Also the tank is preferably grounded as indicated at 35, Fig. 1.

Comparatively high voltage may be used to advantage as the usual domestic current of 110 or 220 volts may be used. The current used is preferably not to exceed 220 volts, however, and the resistance elements are preferably of such dimension and material that if run dry the temperature of the element would not exceed about 1400° to 1500° F. Run in water, of course, the heat is conducted away with great rapidity and the element surface temperatures are much less than this. Care should be taken to see that the heated elements are kept submerged in the water.

It will be seen that high efficiency is attainable with the present invention, the heated elements being directly in contact with the water, which is kept in continued circulation by reason of the presence of localized regions of heat application, and that the usual losses due to insulating coverings and the like for the resistance elements are eliminated, and also that effective heating results are obtained even from current leakage, since wherever the current passes through the water from element to element or between different convolutions or zones of the element or elements or between the elements and the shell of the container, thus permitting the passage of current in substantial excess of the current density which the element is adapted to carry when exposed to the air, heat is produced and the temperature of the water raised. Because of the fact that rusting of the elements is practically eliminated, the efficient results obtained are not subject to progressive diminution as is the case with rustable heating elements, but same can be maintained without material reduction for an indefinitely long period.

Related subject matter is disclosed and claimed in my copending applications Serial No. 462,664 filed April 16, 1921 and Serial No. 462,665 filed April 19, 1921.

I claim:

1. In a device for heating water, a metallic water tank, a bare rustless metallic heating element therein submerged in and directly exposed to the water, said element comprising parts separated only by a relatively narrow water gap, and means for supplying electrical current to the heating element in substantial excess of the current density which the element is adapted to carry when exposed to the air, whereby the water is heated both from the heated element and by conduction of the current from part to part of the element through the water.

2. Device according to claim 1, in which the metallic tank is included in the electrical circuit and water is heated by passage of current therethrough from element to tank.

In testimony that I claim the foregoing, I have signed my name hereto.

PERCY A. E. ARMSTRONG.